Aug. 12, 1969     H. R. GREENE     3,461,321
COMPOSITE MONOSTABLE MULTIVIBRATOR SYSTEM
Filed May 16, 1966     3 Sheets-Sheet 1

INVENTOR.
HAROLD R. GREENE
BY Allan Ratner
ATTORNEY

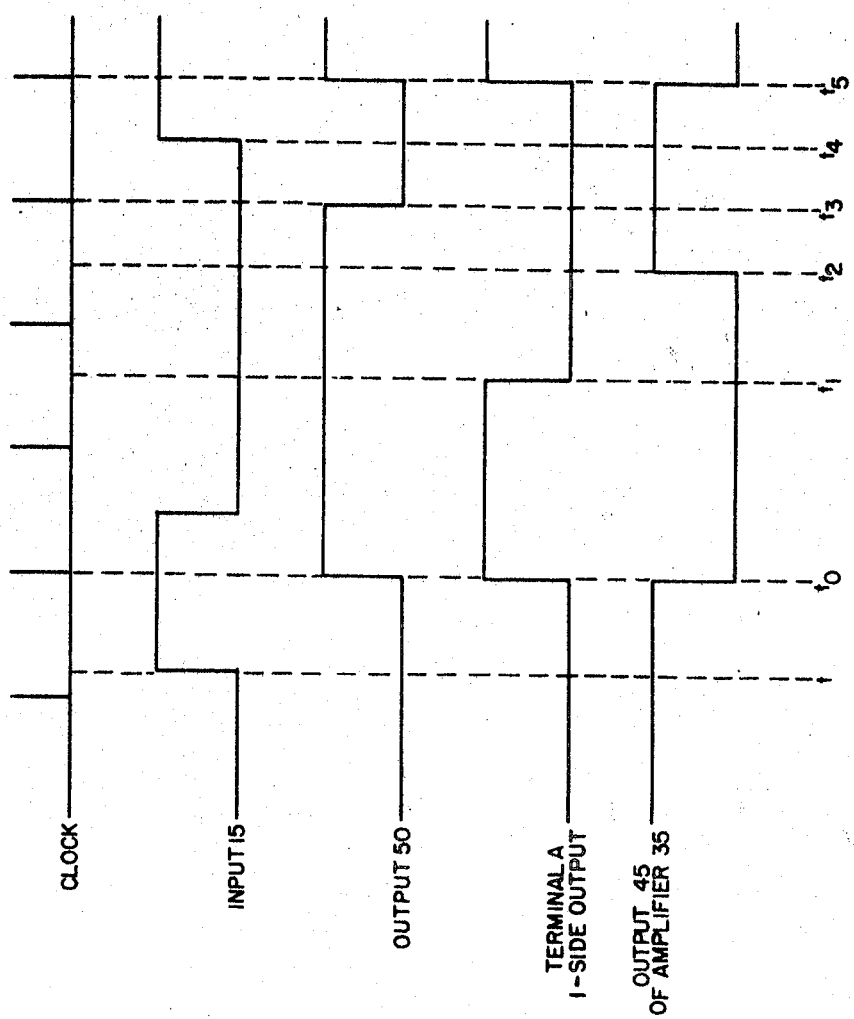

United States Patent Office 3,461,321
Patented Aug. 12, 1969

3,461,321
COMPOSITE MONOSTABLE MULTIVIBRATOR
SYSTEM
Harold R. Greene, New Shrewsbury, N.J., assignor to Electronic Associates Inc., Long Branch, N.J., a corporation of New Jersey
Filed May 16, 1966, Ser. No. 550,358
Int. Cl. H03k 3/26
U.S. Cl. 307—273         8 Claims

ABSTRACT OF THE DISCLOSURE

The disclosure relates to a monostable multivibrator system having 100% duty cycle by providing, in combination, a "JK" flip-flop, a monostable multivibrator and a switching circuit with a breakdown means connected between the monostable and the switch.

---

Figure 1:
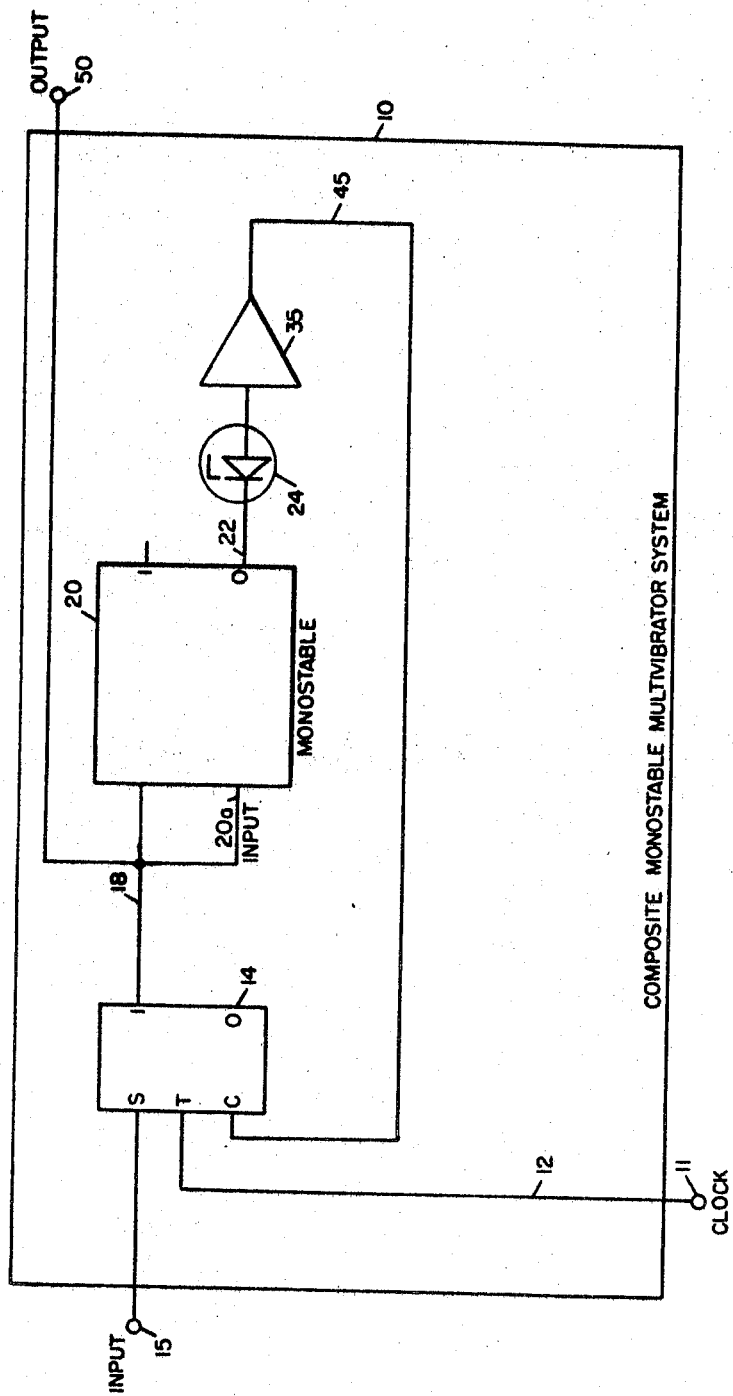

This invention relates to multivibrator circuits and more particularly to a composite monostable multivibrator system having substantially 100% duty cycle.

Monostable multivibrators are known in the art to have one normal or stable state and one quasi-stable state. During the time of the quasi-stable state an output pulse is produced having a "natural" pulse width determined by the time duration that the multivibrator remains in its quasi-stable state. At the termination of the quasi-stable state, the monostable multivibrator requires a period of time to "recover" until it can be again switched to its quasi-stable state.

Many known monostable multivibrators comprise a pair of transistors which are cross-connected and include a coupling capacitor within one of the cross-connections. A stable state is provided when a first transistor of the pair is normally conductive and the second transistor of the pair is normally non-conductive; a quasi-stable state is provided when the conductivity state of the transistors are reversed. An input trigger signal is used to induce transition of the multivibrator from the stable state to the quasi-stable state. During such transition the coupling capacitor begins to discharge and continues to discharge until the first transistor is rendered conductive to return the multivibrator to its stable state. At the termination of the quasi-stable state, the capacitor is charged until a steady state value is reached and only at that time may the multivibrator again be switched to its quasi-stable state. The time it takes to suitably charge the coupling capacitor is referred to as the "recovery time" while the "duty cycle" is defined as the ratio of the time in the quasi-stable state to the sum of the time of the quasi-stable state plus the recovery time. As well known by those skilled in the art, it is desirable to have the duty cycle as long as possible and the recovery time as short as possible. Many known monostable multivibrators have a duty cycle of 90% and a recovery time of 10% and in spite of adding additional expensive and complex circuitry a duty cycle of only as high as 99% has been achieved.

Accordingly, an object of the present invention is a monostable multivibrator system having a substantially 100% duty cycle and a substantially 0% recovery time.

Another object of the present invention is a "composite" monstable multivibrator system which includes a monostable multivibrator of known type in combination with additional simple and inexpensive circuits to achieve a reliable system having substantially 100% duty cycle.

In accordance with the present invention, there is provided a composite monostable multivibrator system which produces a "composite pulse width" equal in time duration to the sum of the time duration of the quasi-stable state "natural" pulse width of the known monostable multivibrator plus the time of its recovery. Thus, the composite pulse width is equal in time duration to the sum of the natural pulse width of the known multivibrator plus its recovery pulse width. At the termination of the composite pulse width, the composite multivibrator system may immediately be switched from the stable state to the quasi-stable state.

The composite multivibrator system may be synchronized with clock pulses so that an output pulse width starts on a selected clock pulse and ends on the first clock pulse after the composite pulse width. In this manner, the composite system is capable of repeating on the very next clock pulse after the composite pulse width no matter how long the pulse width of the composite signal or how short the clock interval.

In carrying out the present invention in one form thereof, the composite monostable multivibrator system comprises a monostable multivibrator having a breakdown device connected to the charging circuit of a multivibrator coupling capacitor. The other side of the breakdown device is connected to switching circuit means which provides an output for the composite system. Upon application of an input trigger signal the monostable multivibrator is switched to its quasi-stable state and an output pulse is initiated at the composite output. At the termination of the quasi-stable state, the monostable is swiched but no change is produced in the composite output pulse. During the recovery interval as the coupling capacitor acquires charge, the potential applied to the break-down device increases until breakdown occurs and a reference voltage is connected to the capacitor to terminate the charging period. In this manner, the recovery period as well as the output composite pulse are also terminated. Thus, in accordance with the invention at the termination of the composite pulse, the multivibrator may immediately again be switched to its quasi-stable state, thereby achieving substantially 100% duty cycle.

Figure 2:
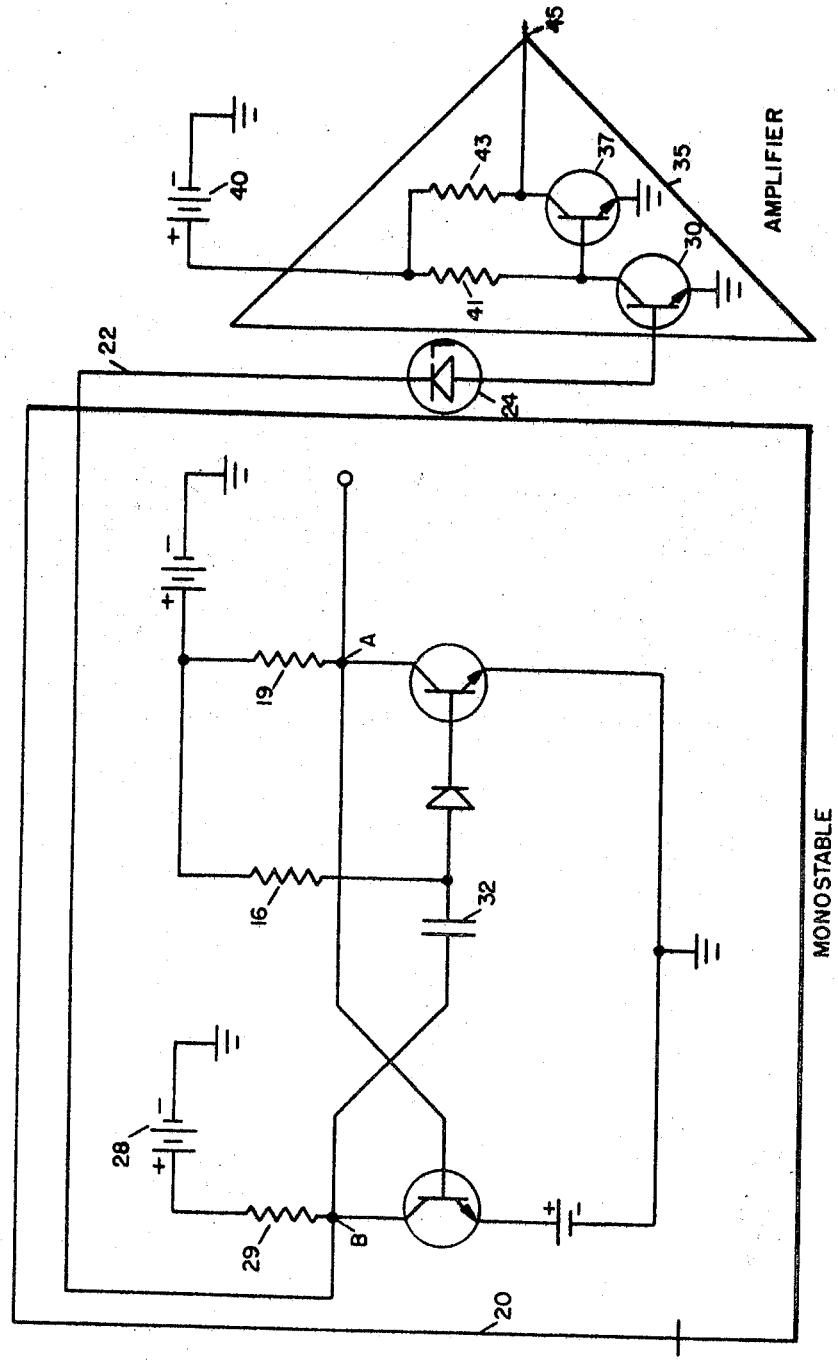

For a more detailed disclosure of the invention and for further objects and advantages thereof, reference is to be had to the following description taken in conjunction with the accompanying drawings in which:

FIG. 1 illustrates in block diagram form a composite monostable multivibrator system of the present invention;

FIG. 2 schematically illustrates portions of the block diagram of FIG. 1; and

FIG. 3 illustrates the waveshapes applied to and produced by the system of FIG. 1.

Referring now to FIG. 1, the invention in one form has been shown as a composite monostable multivibrator system 10 synchronized with clock pulses. The clock pulses are applied to a terminal 11 and are transmitted by way of a conductor 12 to the trigger input of a "JK" flip-flop 14. A "JK" flip-flop is known in the art as a flip-flop in which no ambiguous output state can result from simultaneous inputs in a 1-state. In such circuits inputs in a 1-state on both the set (S) and clear (C) inputs cause the output state to reverse or "toggle" on each clock pulse. "JK" flip-flops are well known in the art and are described, for example at p. 128 et seq., Logical Design of Digital Computers, Montgomery Phister, Jr., John Wiley & Sons, Inc., 1958.

For the purpose of this explanation, it will be assumed that 0-state corresponds to zero volts or ground and 1-state corresponds to a positive potential with respect to ground. Thus, in the "JK" flip-flop an input trigger signal applied to the set input is effective to switch the flip-flop only when the flip-flop has its 0-side in a 1-state and its 1-side in an 0-state commonly called a "0-state flip-flop condition." In flip-flop 14, the upper side is the 1-side and the lower side is the 0-side. In like manner, an input trigger signal to the clear input is effective to switch the flip-flop only when the flip-flop has its 0-side in a 0-state and its 1-side in a 1-state.

It will be assumed that the 1-side of the flip-flop is in a 0-state at time $t$ as shown in FIG. 3. At time $t$ a 1-state input trigger signal is applied to input terminal 15 which is transmitted to the set input thereby enabling flip-flop 14 so that at the time of the next clock pulse applied to the trigger (T) input, the flip-flop will be switched. Specifically, at time $t_0$ there is produced a first clock signal after the time of the input signal, which clock signal is applied by way of clock terminal 11 to the trigger (T) input of flip-flop 14, thereby switching flip-flop 14 to produce from its 1-side output an output signal in a 1-state. The positive-going 1-state signal is conducted by way of lead 18 to a trigger input terminal 20a of a monostable multivibrator 20.

It will be understood that monostable multivibrator 20 may be any one of the types well known in the art such as disclosed in U.S. Patent No. 3,213,297. As set forth in that patent and as shown in less detail in FIG. 2, in which corresponding elements have similar reference characters, the left hand and right hand transistors are cross-connected with the right hand transistor being normally conductive with its collector connected to terminal A. The left hand transistor is normally non-conductive with its collector connected to terminal B. Terminal A is the 1-side output of the multivibrator 20 which provides a pulse width of time duration equal to the time duration of the quasi-stable state between $t_0$ and $t$, as shown by the waveform in FIG. 3. Terminal B indicated the 0-side output of the multivibrator 20 which is connected in the charging and discharging circuit of the coupling capacitor 32.

At the time of the termination of the quasi-stable state and as the left hand transistor is rapidly rendered nonconductive, point B is caused to rise in potential and the charging of capacitor 32 is initiated thereby to speed the full conduction of the right hand transistor. As capacitor 32 acquires charge from a current source comprising battery 28 and resistor 29 the potential at point B rises until steady-state value is reached and multivibrator 20 may again be switched to its quasi-stable state. However, the normal time of charging capacitor 32 is modified in accordance with the invention as described below.

As previously described, a positive-going 1-state signal is applied to trigger input 20a at time $t_0$. The multivibrator 20 responds only to the leading edge of this positive-going signal with the left hand transistor of multivibrator 20 being rendered conductive. Thus, the potential at point B changes in a negative going direction approaching ground potential indicating a 0-state signal. The potential at point B is applied by way of a 0-side output conductor 22 to the cathode of breakdown device of Zener diode 24. At the termination of the quasi-stable state, viz, time $t_1$ with the left hand transistor being returned to its normal nonconductive state, the potential at point B rises as capacitor 32 begins to acquire charge. Thus, during the quasi-stable state or the "natural" pulse width from time $t_0$ to time $t_1$ the Zener diode 24 is nonconductive. Diode 24 remains nonconductive after time $t_1$ as capacitor 32 acquires charge. This time of charging capacitor 32, $t_1$–$t_2$ is referred to as the recovery time of the monostable multivibrator 20. As capacitor 32 is charged, the positive potential applied to the cathode of diode 24 increases until the Zener breakdown potential is reached and the Zener diode is rendered conductive. With diode 24 conductive, a positive potential is applied by way of its anode to the base of an amplifier transistor 30 of a noninverting amplifier 35. Accordingly, transistor 30 is rendered conductive and a conductive circuit therethrough may be traced by way of the positive side of a battery 28, a resistor 29, point B, conductor 22, Zener diode 24, and the base and the emitter of conductive transistor 30 and then to ground. The foregoing circuit elements are selected so that the diode 24 is rendered conductive prior to the end of the recovery time of multivibrator 20 which would ordinarily occur in the absence of diode 24. The time of diode 24 conduction in the example shown in FIG. 3 occurs at time $t_2$.

With the foregoing conductive circuit, the 0-side or terminal B of multivibrator 20 is clamped at a potential (a reference potential) at which the Zener diode 24 conducts and therefore can go no further in a positive-going direction. In this manner, somewhat prior to the normal recovery time of multivibrator 20, at time $t_2$ the charging of capacitor 32 is terminated since the current from the current source 28 and 29 is diverted from the capacitor to the conductive diode 24. At this time the capacitor has reached its final charging potential and is substantially completely charged. Thus, the multivibrator 20 is ready to again be retriggered or switched to its quasi-stable state by the application of a positive going input trigger signal to input terminal 20a.

As previously described, at time $t_2$, the positive-going input signal to transistor 30 is effective to render that transistor conductive thereby to apply a signal by way of its collector to the base of a second amplifier transistor 37 of the non-inverting amplifier 35. Both transistors 30 and 37 are of the NPN type having a positive source of supply 40 connected by way of a resistor 41 to the collector of the transistor 30 and by way of a resistor 43 to the collector of the transistor 37. Accordingly, upon application of a positive-going signal to transistor 30 rendering conductive that transistor, transistor 37 is rendered nonconductive. Thus, at time $t_2$ the output 45 of amplifier connected to the collector of transistor 37 changes in potential in a positive-going direction as shown in FIG. 3. In this manner, the output of amplifier 45 from times $t_0$ to $t_2$ is in a 0-state, while at time $t_2$ the output changes to a 1-state output.

Thus, in accordance with the invention it will be understood that the Zener diode 24 operates as a breakdown device connected to the charging and discharging circuit of the monostable multivibrator 20. Amplifier 35 which operates as switching means produces a negative output pulse starting at time $t_0$ which is the time at which the multivibrator 20 is switched to its quasi-stable state and diode 24 is rendered nonconductive. The output pulse from the switch 35 at output terminal 45 continues in time duration exceeding the time duration of the quasi-stable state of "natural" pulse width of multivibrator 20 and continues until diode 24 breaks down. At time $t_2$ which is the termination of the 0-state pulse at output terminal 45 the monostable multivibrator 20 may again be switched or triggered. In this manner, there is produced a pulse width from time $t_0$–$t_2$ equal to the sum of the natural pulse width plus the recovery pulse width of multivibrator 20. With the monostable multivibrator being triggerable at time $t_2$ a 100% duty cycle is thereby achieved. It will be understood by those skilled in the art that if the output of amplifier 35 is desired to be the output of the composite monostable multivibrator system 10 then amplifier 35 in such modification would be an inverting amplifier so that the output pulse would be in a 1-state from time $t_0$ to time $t_2$.

However, in the embodiment shown in FIG. 1 the output of amplifier 35 is connected to the clear (C) input of flip-flop 14. It will be recalled that flip-flop 14 is in the state in which its 0-side is in an 0-state and therefore upon application of a positive signal to the clear input, that flip-flop is enabled. It will also be understood that between times $t_0$ and $t_2$ with the one-side of flip-flop 14 in a 1-state any input trigger signals applied to input terminal 15 were not effective to enable flip-flop 14. However, the foregoing trigger signal applied to the clear terminal effective to enable flip-flop 14 and upon application of the next clock signal at time $t_3$ the flip-flop 14 is reset. That is, its 0-side is switched to a 1-state and its 1-side is switched to a 0-state as shown in FIG. 3 at output 50 of the composite system which is connected to the 1-side of flip-flop 14.

It will now be understood that the output 50 of the composite system 10 produces an output pulse beginning at the next clock signal after an input triggering signal is applied to an 0-state flip-flop 14, viz time $t_0$ the output pulse terminates at the first clock signal after the termination of a pulse width equal in time duration to the natural pulse width plus the recovery pulse width, viz time $t_3$. In this manner, system 10 is capable of repeating on the very next clock pulse no matter how long the pulse width of the output signal 50 or how short the clock interval of the clock pulse as applied to terminal 11.

Thus, in accordance with the invention after time $t_3$, the composite monostable multivibrator system 10 is again ready to produce a new output pulse at output terminal 50 when (1) an input trigger signal in a 1-state is applied to terminal 15 of the reset flip-flop and (2) a clock pulse is applied after that 1-state signal. Specifically, at time $t_4$ a new 1-state input trigger signal is applied to the 0-state flip-flop 14 and at time $t_5$ a clock pulse is applied in time after that trigger signal. In this manner, a new composite output pulse is produced at output terminal 50. It will be understood that if the input trigger signal at time $t$ remained in a 1-state at least until time $t_3$, then the system can be triggered on the very next clock pulse, time $t_5$ after the termination of the output pulse at terminal 50.

Now that the principles in the invention have been explained, it is to be understood that many modifications may be made all within the scope of the following claims.

What is claimed is:

1. A composite monostable multivibrator system having substantially 100% duty cycle comprising
   a monostable multivibrator having at least one input triggering terminal, said monostable multivibrator including a coupling capacitor connected to a charging-discharging circuit for determining the quasi-stable state time duration and the recovery time duration of said monostable multivibrator,
   breakdown means connected to said capacitor circuit to provide an output signal at a predetermined time during said recovery time duration of said monostable multivibrator thereby terminating said recovery time duration,
   switching circuit means connected to the output of said breakdown means for producing an output pulse equal in time duration to the sum of the time duration of the quasi-stable state plus the time duration of the terminated recovery time whereby at the termination of said output pulse said monostable multivibrator may again be switched to its quasi-stable state to provide substantially 100% duty cycle,
   a flip-flop having a first, a second and a trigger input and a first output,
   means for applying clock pulses to said trigger input,
   means for applying input trigger signals to said first input,
   means connecting said switching circuit means to said second input, and means connecting said first output to an input trigger terminal of said monostable multivibrator whereby an input trigger signal applied to said first input is effective to enable said flip-flop to provide an output pulse at the time of the next succeeding clock pulse to switch said monostable multivibrator to its quasi-stable state to initiate a composite output pulse at said first output which is terminated at the time of the first clock pulse after termination of the output pulse from said switching means.

2. The composite system of claim 1 in which said monostable multivibrator includes a pair of switching devices cross-connected by a pair of cross connections with a first of said cross-connections including a coupling capacitor,
means connecting said breakdown device between said first cross connection and said switching circuit means whereby said device is rendered nonconductive at the initiation of the quasi-stable state and is rendered conductive only when said capacitor has acquired a predetermined value of charge at said predetermined time.

3. The composite of claim 2 in which said breakdown device is a breakdown diode and said switching circuit means includes at least one switching device connected in series circuit between said breakdown device and a point of reference potential whereby said breakdown diode conducts when said capacitor acquires said predetermined charge to complete a circuit through said breakdown diode and said switching device to said point of reference potential.

4. The composite system of claim 3 in which said breakdown diode is a Zener diode and said switching device is a transistor connected between a point of reference potential and the anode of said Zener diode.

5. A composite monostable multivibrator system having substantially 100% duty cycle comprising
   a monostable multivibrator having a pair of switching devices cross connected by a pair of cross connections for providing a stable state and a quasi-stable state,
   a first of said cross connections including a coupling capacitor,
   said monostable multivibrator including means connected to said first cross connection for discharging said capacitor during said quasi-stable state and for initiating the charging of said capacitor at the termination of said quasi-stable state to begin a recovery time duration,
   switch means connected to said first cross connection for producing at an output an output pulse beginning at the initiation of the quasi-stable state and terminating at a predetermined time during said recovery time duration only after said capacitor acquires a predetermined value of charge,
   said switch means including means for applying a reference potential to said capacitor at said predetermined time to terminate said charging of said capacitor whereby said capacitor is substantially completely charged and whereby said output pulse has a time duration equal to the sum of the time duration of the quasi-stable state and the time duration of the terminated recovery time.
   a flip-flop having a set, a clear and a trigger input, a 1-side output and a 0-side output in which the set input is effective to switch said flip-flop only if the 1-side output is in a 0-state and the clear input is effective to switch said flip-flop only if the 0-side is in a 0-state,
   means for applying clock pulses to said trigger input,
   means for applying input trigger signals to said set input,
   means connecting said output of said switch means to said clear input, and
   means connecting said 1-side of said flip-flop to an input trigger terminal of said monostable multivibrator whereby an input trigger signal applied to said set input is effective to enable said flip-flop to provide an output pulse at the time of the next succeeding clock pulse to switch said monostable multivibrator to its quasi-stable state to initiate a composite output pulse at said 1-side which is perminated at the time of the first clock pulse after the termination of the output pulse from said switch means.

6. The composite system of claim 5 in which said switch means comprises switching circuit means and breakdown device,
   means connecting said breakdown device between said first cross connection and said switching circuit means whereby said device is rendered nonconductive at the initiation of the quasi-stable state and is rendered conductive only when said capacitor has acquired said predetermined value of charge.

7. The composite system of claim 6 in which said breakdown device is a breakdown diode and said switching circuit means includes at least one switching device connected in series circuit between said breakdown device and a point of reference potential whereby said breakdown diode conducts when said capacitor acquires said predetermined charge to complete a circuit through said breakdown diode and said switching device to said point of reference potential.

8. The composite system of claim 7 in which said breakdown diode is a Zener diode and said switching device is a transistor connected between a point of reference potential and the anode of said Zener diode.

References Cited

UNITED STATES PATENTS

| | | | |
|---|---|---|---|
| 2,976,432 | 3/1961 | Geckle | 307—273 |
| 3,171,978 | 3/1965 | Weber | 307—273 |

ARTHUR GAUSS, Primary Examiner

H. DIXON, Assistant Examiner